United States Patent
Paschen

[11] Patent Number: 5,822,683
[45] Date of Patent: Oct. 13, 1998

[54] PSEUDO-PASSIVE TRANSPONDER DEVICE

[75] Inventor: Dean Alan Paschen, Lafayette, Colo.

[73] Assignee: Ball Aerospace and Technologies Corp., Broomfield, Colo.

[21] Appl. No.: 628,764

[22] Filed: Apr. 5, 1996

[51] Int. Cl.⁶ .............................. H04Q 7/20; H04Q 5/22
[52] U.S. Cl. .............................. 455/66; 455/66; 455/562; 340/825.54; 340/572
[58] Field of Search .................... 455/562, 269, 455/25, 66, 106; 342/44, 52, 42, 43, 51, 372, 373; 340/825.54, 572

[56] References Cited

U.S. PATENT DOCUMENTS

| | | | |
|---|---|---|---|
| 3,103,655 | 9/1963 | Jones | 340/258 |
| 3,713,148 | 1/1973 | Cardullo et al. | 342/42 |
| 3,757,035 | 9/1973 | Sullivan | 340/825.54 |
| 4,114,151 | 9/1978 | Denne et al. | 455/19 |
| 4,337,376 | 6/1982 | Gruenberg | 455/17 |
| 4,364,043 | 12/1982 | Cole et al. | 340/825.54 |
| 4,956,645 | 9/1990 | Guena et al. | 342/361 |
| 5,095,309 | 3/1992 | Troyk et al. | 340/825.54 |
| 5,164,719 | 11/1992 | Guena et al. | 340/825.54 |
| 5,189,397 | 2/1993 | Watkins et al. | 340/572 |
| 5,245,346 | 9/1993 | Nishimura et al. | 342/42 |
| 5,294,931 | 3/1994 | Meier | 342/44 |
| 5,305,008 | 4/1994 | Turner et al. | 342/44 |
| 5,355,521 | 10/1994 | Henoch et al. | 455/59 |
| 5,425,032 | 6/1995 | Shloss et al. | 455/523 |
| 5,440,302 | 8/1995 | Irmer et al. | 340/870.31 |
| 5,448,110 | 9/1995 | Tuttle et al. | 257/723 |
| 5,602,744 | 2/1997 | Meek et al. | 340/870.02 |
| 5,615,409 | 3/1997 | Forssen et al. | 455/564 |
| 5,645,607 | 7/1997 | Schurmann et al. | 455/517 |
| 5,680,459 | 10/1997 | Hook et al. | 380/23 |

*Primary Examiner*—Dwayne D. Bost
*Assistant Examiner*—Jean A. Gelin
*Attorney, Agent, or Firm*—Sheridan Ross P.C.

[57] ABSTRACT

The present invention relates to a wireless transponder system. The transponder system includes a transponder device which is capable of operating over a relatively long range without the need for frequent battery replacements. The transponder device includes both an antenna means and a signal modification means. The signal modification means is operative for modulating an interrogation signal received from a reader device. The modulation means may utilize low power switching components that allow it to operate continuously while drawing very little current from an internal battery. In this way, the battery within the transponder will not become prematurely drained and can last up to substantially the shelf-life of the battery. In one embodiment, the transponder of the present invention utilizes a retrodirective array antenna for achieving increased antenna gain in the direction of a reader device, and therefore increased range, without an associated reduction in effective antenna coverage.

37 Claims, 9 Drawing Sheets

PSEUDO-PASSIVE TRANSPONDER DEVICE

FIELD OF THE INVENTION

The present invention relates generally to wireless transponders and, more particularly, to transponders which modify a signal received from a source and radiate the modified signal back to the source.

BACKGROUND OF THE INVENTION

Wireless transponder systems are currently used in a wide variety of applications. For example, they can be used by a package delivery service to identify packages for routing purposes, etc. or they can be used by livestock producers to indicate, e.g., cattle feeding routines. In such systems, a transponder device generally contains, or has access to, information relevant to an object to which the transponder is associated. The information may include, for example, object identification information; information relating to one or more operational parameters of the object, such as air pressure in a tire; or other information. When the information carried by the transponder is desired to be known, a reader device (also known as an interrogator) is used to "read" the transponder.

To "read" the transponder, the reader device irradiates the transponder with an electromagnetic signal, known as an interrogation signal, which can include, for example, a beam of radio-frequency energy. The transponder receives the interrogation signal and, in response, transmits an information signal back to the reader device. The reader device then receives the information signal and demodulates it to determine the information carried by the signal. A reader device can generally "read" a transponder from any distance within a maximum range; the maximum range depending on the particular system being used.

In general, wireless transponder systems may use passive or active transponder devices. The difference between these two types of devices is the source of operational power used. Passive transponder devices, for example, derive operational power from the received interrogation signal. The interrogation signal is rectified and processed within the transponder to provide DC power to the device. This DC power is then used to activate a transmitter or modulator within the transponder to deliver the information signal to the reader device.

Active transponder devices, on the other hand, derive operational power from an internal battery. Normally, the battery is used by the active transponder for, among other things, providing power to a receiver within the transponder which is used for detecting the arrival of the interrogation signal. Once the interrogation signal is detected by the receiver, a transmitter is activated (which is also powered by the battery) for delivery of the information signal to the reader device. Because the transmitter generally requires a relatively large amount of current to operate properly, the battery is concomitantly drained each time an interrogation takes place. In addition, the receiver also drains a significant amount of energy from the battery.

Each of the above-described transponder devices has limitations associated with it. Passive transponders, for example, suffer from limited reading range. Because a passive transponder derives power from the interrogation signal, a limited amount of power is available for transmitting the information signal back to the reader device. This power limitation results in a reduced range over which the information signal may be detected by the reader device.

Active transponders, while achieving much greater range, suffer from relatively short battery life. As described above, the batteries in these devices are drained of a significant amount of charge each time the device is interrogated. As a result, a frequently used transponder will require frequent battery replacements. In addition, if the interrogation signal is left "on" for a relatively long period of time, such as when the reader device is stuck in the on position, the battery in the transponder can be fully drained rather quickly. This could lead to a situation where some transponders in a system have dead batteries while others do not, which could be disastrous in certain high volume object identification applications.

SUMMARY OF THE INVENTION

The present invention relates to a wireless transponder system which is capable of overcoming some of the limitations of past systems. The transponder system includes a transponder device which is capable of operating over a relatively long range without the need for frequent battery replacements. The transponder device of the present invention is useful in many different applications, both governmental and commercial. For example, the device may be used in government logistics tracking. In such an application, a device is placed on every crate, pallet, etc. in a government supply house. A reader device located near the door of the supply house, or on the door of a delivery truck or airplane, can then automatically keep track of every item which enters or leaves the supply house without having to make physical contact with the item. Increased operational range is important in such an application because items can be missed if they are located too far from the reader when passing it. Similarly, long predictable battery life is also important in such an application because items having transponders with dead batteries will likewise be missed by the reader device. In a similar application, the transponder device may be used to track packages at a commercial shipping port as the packages are loaded or unloaded from vessels.

The transponder of the present invention includes an antenna for receiving a signal from, and subsequently radiating the signal to, a reader device and an apparatus coupled to the antenna for modifying the signal after it is received by, but before it is radiated from, the antenna. The modification apparatus is capable of imparting information to the received signal, such as object identification information and battery freshness date. Upon receiving the modified signal, the reader device can extract the information from the signal for use by an operator. For example, if the information indicates that the freshness data for the transponder battery is approaching, the operator can replace the battery before it becomes fully drained. In addition, the modification apparatus may also modify the interrogation signal so that the reader device may distinguish the modified signal from clutter.

In one aspect of the present invention, the transponder device includes antenna means and signal modification means. More particularly, the antenna means is capable of receiving a signal from any angle in a first range of angles, without a priori knowledge of the arrival of the signal at the antenna means, and subsequently radiating the signal in a beam centered substantially at the angle from which it was received, wherein substantially all of the energy in the radiated signal is concentrated in a second range of angles which is narrower than the first range of angles. Conventional antennas generally radiate signals in a beam of equal angular range to the range of angles over which they are capable of receiving signals. By using an antenna which concentrates the radiated signal in a range of angles narrower than the range of angles over which signals may be received, the transponder of the present invention achieves greater operational range (i.e., distance) than transponders which use conventional antennas. This is because the energy in the signal is concentrated, to a greater extent, in the direction of the reader device and, therefore, the signal is capable of travelling a greater distance before being reduced to a strength where it can no longer be detected by receiver circuitry within the reader device. The antenna means may include, for example, a retrodirective antenna array.

The signal modification means modifies the signal from the reader device after the signal has been received by the antenna means and before the signal has been radiated from the antenna means. Signal modification is performed, as described above, to impart information to the signal. It may also be performed for clutter rejection purposes. The signal modification means may include, for example, phase modulation means and/or amplitude modulation means. The phase modulation means may perform any type of phase modulation on the signal including, for example, simple binary phase shift or the more complex pseudo-noise code. For instance, the phase modulation means may include a phase shifter capable of switching between two transmission line segments of different lengths. Alternatively, the phase modulation means may include phase shifters using reactive loading, reflection, and/or filter techniques or any other phase shifting technique. The amplitude modulation means may include any device capable of varying the attenuation of a signal flow path, such as a variable resistor network or a transistor. A transistor, for example, can be used for alternately allowing and blocking signal flow along the path. Both the phase modulation means and the amplitude modulation means may include low-power switching devices to perform their respective functions. In one embodiment of the present invention, phase modulation is used for clutter rejection and amplitude modulation is used to impart information to the signal.

In another aspect of the present invention, the transponder device includes antenna means and signal modification means. More particularly, the antenna means is capable of receiving a signal from an exterior source and subsequently radiating a modified signal to the exterior source. The antenna means may include, for example, any commonly available antenna structure, such as: a microstrip patch antenna, a patch array, a dipole antenna, a horn antenna, or others. The antenna may also include a retrodirective antenna array.

The signal modification means receives the signal from the antenna means, modifies the signal, and delivers the modified signal back to the antenna means. More specifically, the signal modification means includes: (1) a signal flow path; and (2) means for continuously and periodically varying the transmission characteristics of the signal flow path regardless of whether a signal is present. The signal flow path may include any means capable of guiding a signal from an input to an output. By continuously and periodically varying the transmission characteristics of the signal flow path, special power-consuming receiver circuitry is not necessary for detecting the reception of a signal from a reader device and for activating power-consuming transmitter circuitry to deliver an information signal to the reader device. Instead, the signal from the reader device is automatically modulated, after reception by the antenna means, by simply flowing through the varying signal flow path. After being modulated, the signal is then delivered back to the antenna which radiates it to the reader device. Because the means for varying can be implemented using low-power circuitry, power consumption can be minimized and battery life can be made to approach the shelf life of the battery. The means for varying may include, for example, phase modulation means and\or amplitude modulation means as described above.

In another aspect of the invention, the transponder device includes antenna means and a means for modifying a signal. The antenna means is as described above. The means for modifying includes: (1) means for receiving the signal from the antenna means; (2) means for delivering the modified signal to the antenna means; (3) a signal flow path between the means for receiving and the means for delivering for guiding the signal therebetween; (4) means for varying the transmission characteristics of the signal flow path so that the signal is modified as it flows through the signal flow path; and (5) means for receiving power from an internal battery and for providing the power to the means for varying.

As described above, the signal flow path may include any means capable of guiding a signal from an input to an output. The means for receiving power may include any means for deriving power from a battery internal to the transponder device for use in energizing the means for varying. For example, the means for receiving power may include a receptacle tailored to receive a battery of a predetermined size, the receptacle having contacts interfacing with the positive and negative terminals of the battery, and electrical conductors for carrying power from the contacts to the means for varying.

The means for varying may include, for example, FET switching devices and/or CMOS digital circuitry for use in varying the flow path transmission characteristics. The switching devices and the digital circuitry are preferably of a low-power consuming variety for prolonging the life of the battery. Also to prolong the life of the battery, it is preferable that only passive characteristics of the signal flow path, such as phase length and attenuation, be varied, i.e., the means for varying does not add any energy to the signal during signal modification. In one embodiment, the means for varying includes a phase modulation means having at least one switching device for switching transmission line sections of varying lengths into the signal flow path. For example, the invention may use two transmission line sections which differ in electrical length by 180 degrees to obtain binary phase shift. In another embodiment, the means for varying includes amplitude modulation means located within the signal flow path. The amplitude modulation means may include at least one switching device for changing the attenuation characteristics of the signal flow path in response to an amplitude modulation signal. For example, a single FET device may be used to alternately pass and block signal propagation through the signal flow path. In yet another embodiment, the means for varying includes both an amplitude modulation means and a phase modulation means which may both share a common switching device.

DETAILED DESCRIPTION

The present invention relates to a wireless transponder system. The transponder system includes a transponder device which is capable of operating over a relatively long range without the need for frequent battery replacements. The transponder device includes both an antenna means and a signal modification means. The signal modification means is operative for modulating an interrogation signal received from a reader device. The modulation means may utilize low power switching components that allow it to operate continuously while drawing very little current from an internal battery. In this way, the battery within the transponder will not become prematurely drained and can last up to substantially the shelf-life of the battery. In one embodiment, the transponder of the present invention utilizes a retrodirective array antenna for achieving increased antenna gain in the direction of a reader device, and therefore increased range, without an associated reduction in effective antenna coverage.

Figure 1:
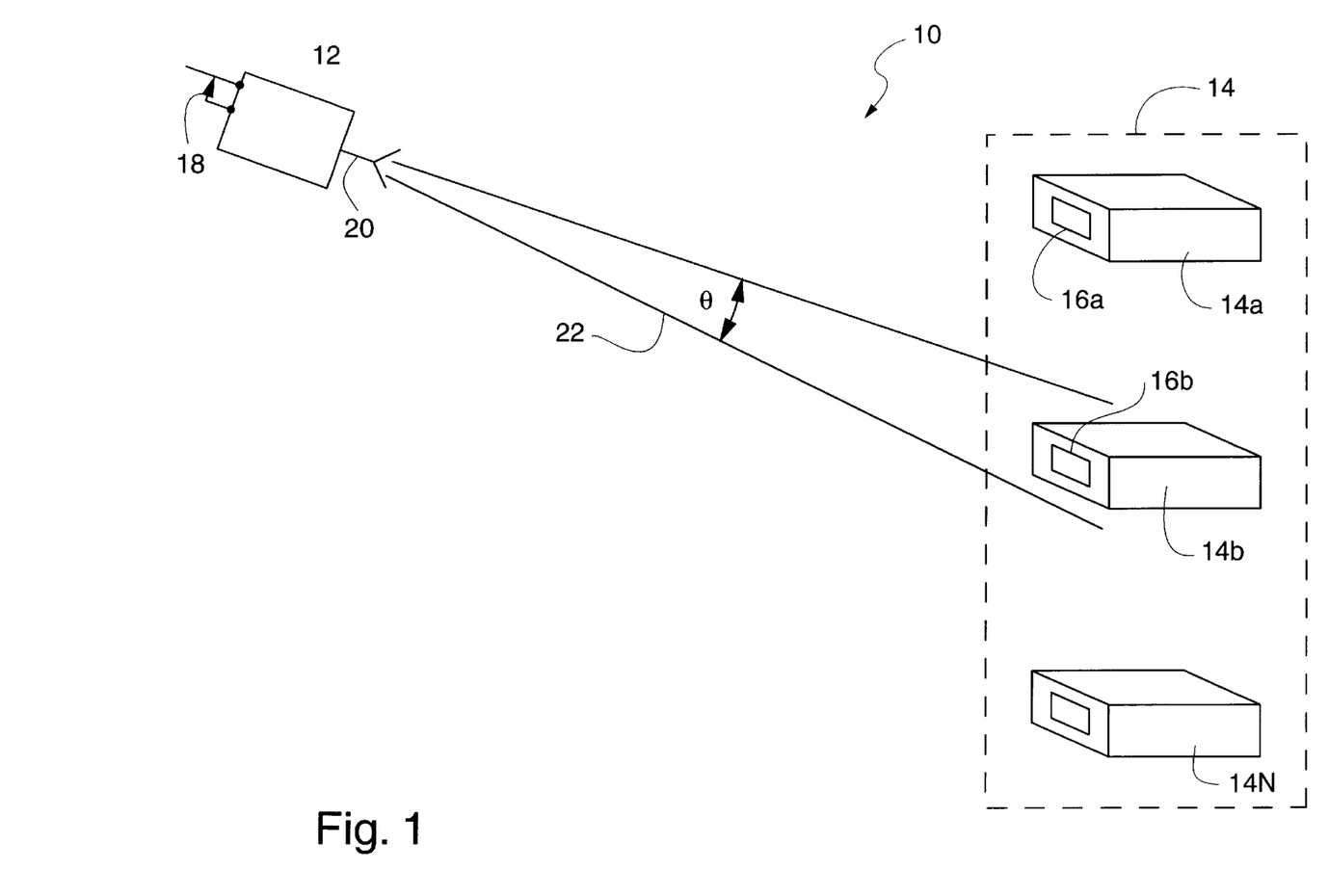
FIG. 1 illustrates a transponder system which may utilize the transponder device of the present invention.

FIG. 1 illustrates a wireless transponder system 10 which may use the transponder device of the present invention. The system 10 includes a reader device 12 and a plurality of objects 14 each having a transponder 16 attached to an external surface. As illustrated, the transponder 16 may be in the form of a label which is adhered to a package. When it is desired to read a transponder associated with a particular object, such as object 14b, an operator points the reader device 12 toward the object 14b and activates the device 12 using switch 18. Upon activation, the reader device 12 emits an interrogation signal from an antenna 20 toward the object 14b. The interrogation signal is transmitted toward the object 14b in a beam 22 having a beamwidth $\neq$ which may depend upon, among other things, the type of antenna 20 being used and the center frequency of the interrogation signal. When the interrogation signal reaches the object 14b, it impinges upon the transponder 16b. The transponder 16b receives the signal and subsequently transmits a return signal to the reader device 12 which contains predetermined information, such as object identification information. The reader device 12 then processes the return signal to determine, for example, the identity of the object 14b.

Figure 2:
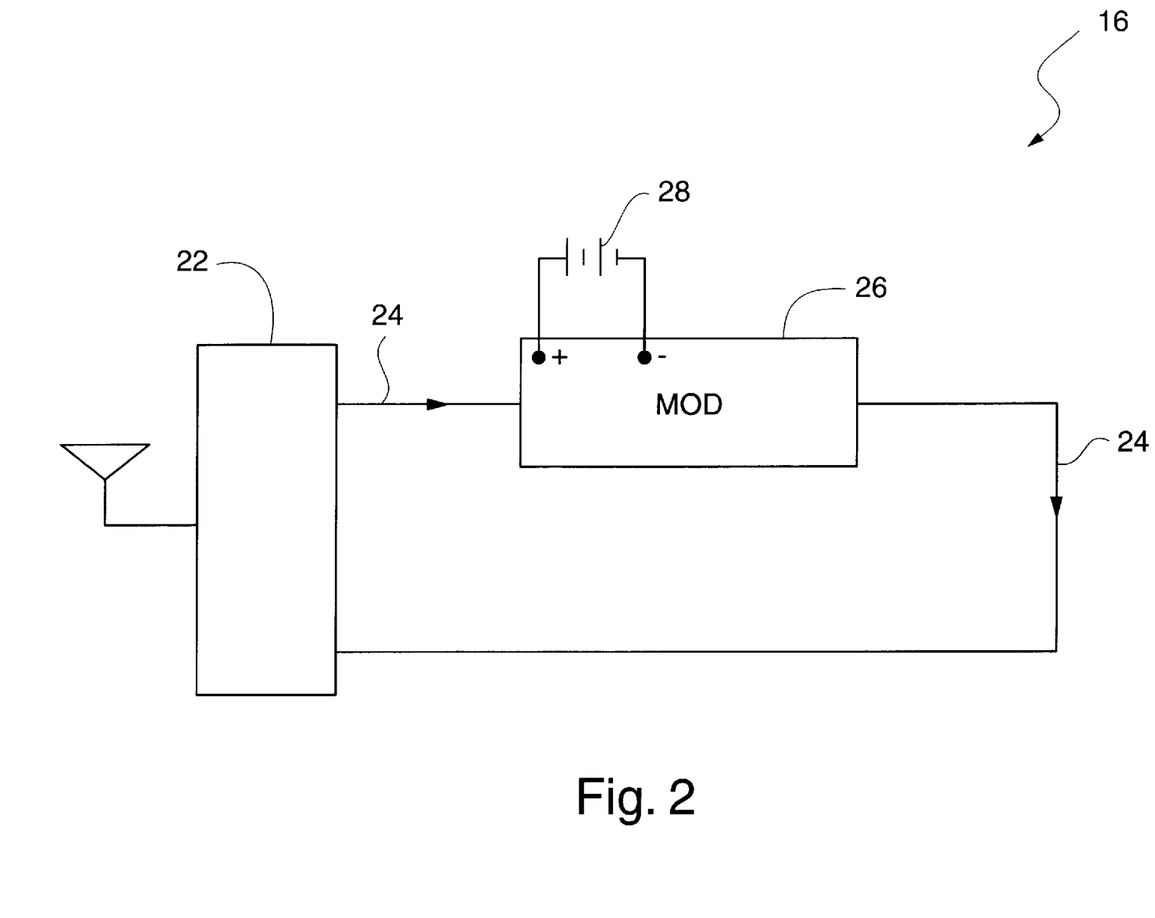
FIG. 2 is a block diagram illustrating a transponder device in accordance with one embodiment of the present invention.

FIG. 2 illustrates a transponder device 16 in accordance with one embodiment of the present invention. The transponder device 16 includes: antenna means 22, a signal flow path 24, and modulation means 26. The antenna means 22 is operative for, among other things, receiving the interrogation signal from the reader device 12 and delivering the interrogation signal to an input of the signal flow path 24. The signal flow path 24 guides the signal through the modulation means 26 and back to the antenna means 22 which radiates the signal back to the reader device 12. The modulation means 26, which is powered by internal battery 28, is operative for changing the transmission characteristics of the signal flow path 24 in such a way that the interrogation signal is modified as it flows through the signal flow path 24. The modification of the interrogation signal imparts information, such as identification information, to the signal before the signal is radiated back to the reader. The reader device 12 can then extract the information from the signal for use by an operator.

In the preferred embodiment of the present invention, the modulation means 26 continuously varies the transmission characteristics of the signal flow path 24 regardless of whether an interrogation signal has recently been received by the antenna means 22. In addition to being continuous, the variation of the transmission characteristics of the signal flow path 24 is preferably periodic in nature, using, for example, the same identification information over and over again. In this way, anytime an interrogation signal is received from a reader device 12, the signal is automatically modulated in the modulation means 26 and transmitted back to the reader 12 with the appropriate information contained therein.

In the preferred embodiment of the present invention, the antenna means 22 includes a retrodirective array antenna. A retrodirective array antenna, as will be discussed in more detail later, is capable of receiving a signal from any one of a continuum of angles and automatically transmitting the signal back at the same angle from which it was received, in a relatively high gain beam, without the use of any active components. The retrodirective array antenna is unique in that, although it can receive signals from a relatively broad range of angles without moving, it can transmit signals back in the direction from which they were received with relatively high directivity.

Figure 3A:
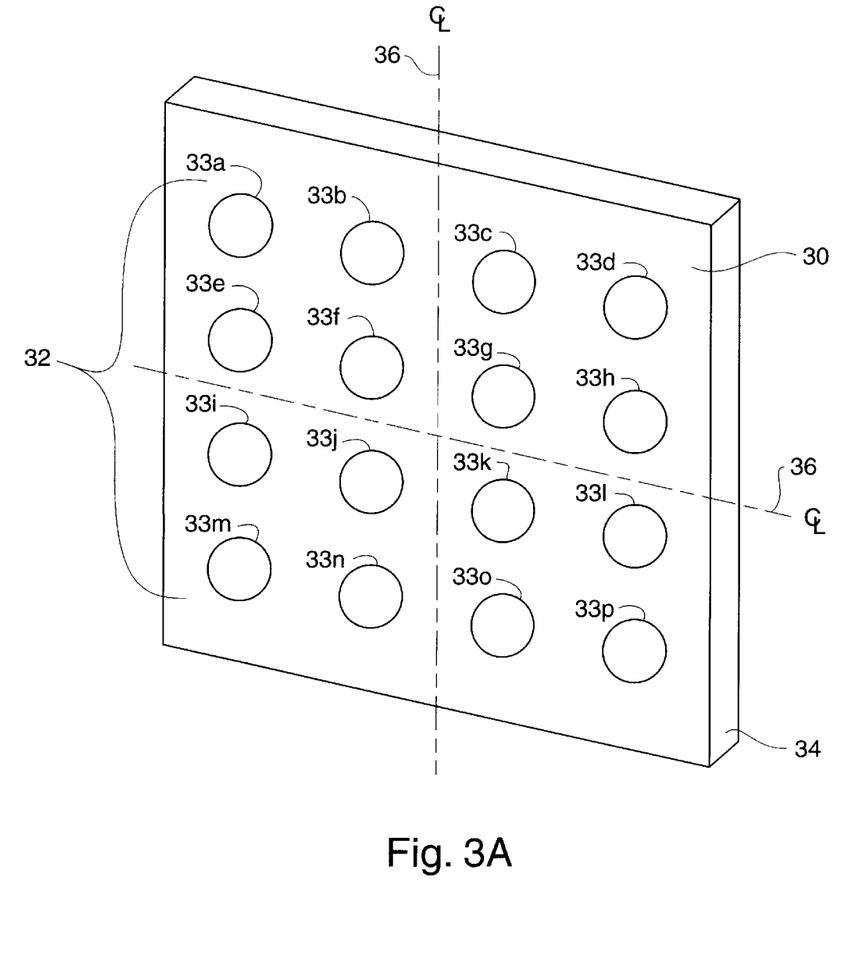
FIGS. 3A and 3B are a front and rear view, respectively, of a two dimensional retrodirective array antenna in accordance with one embodiment of the present invention.

FIG. 3A is a perspective view showing the array face 30 of a typical retrodirective array antenna. As shown in the figure, a retrodirective array antenna includes a plurality of radiating elements 32 disposed in fixed relation to one another on a support structure 34. The plurality of radiating elements 32 may include, for example, a group of microstrip patch elements 33a–33p having a dielectric substrate material as a support structure 34. The elements in the plurality 34 are generally divided by one or two center lines 36 (depending upon whether the array is one or two dimensional) and are interconnected based on their location relative to the centerline(s) 36.

Figure 3B:
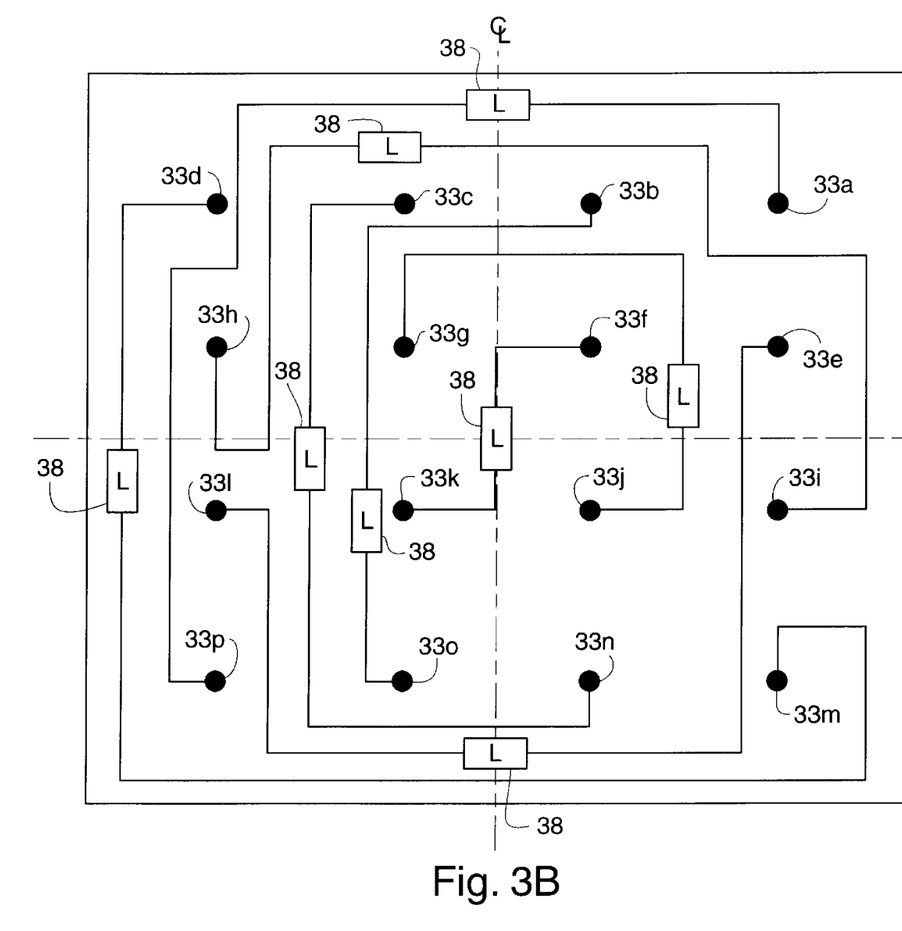

FIG. 3B illustrates the back surface of the antenna illustrated in FIG. 3A, showing a possible interconnection scheme for a 4×4 retrodirective array. As illustrated, each element in the array 32 is electrically connected, by a section of transmission line 38, to one other element in the array 32 to form an element pair. The position of the second element in each element pair is found by "folding" the position of the first element in the element pair about each of the two center lines. For example, in FIG. 3B, element 32d is connected to element 32m, element 32c is connected to element 32n, etc. For reasons which will become apparent shortly, the transmission line section 38 connecting each element pair in the array must be substantially equal in electrical length, L, to all of the other transmission line sections in the array.

Figure 4:
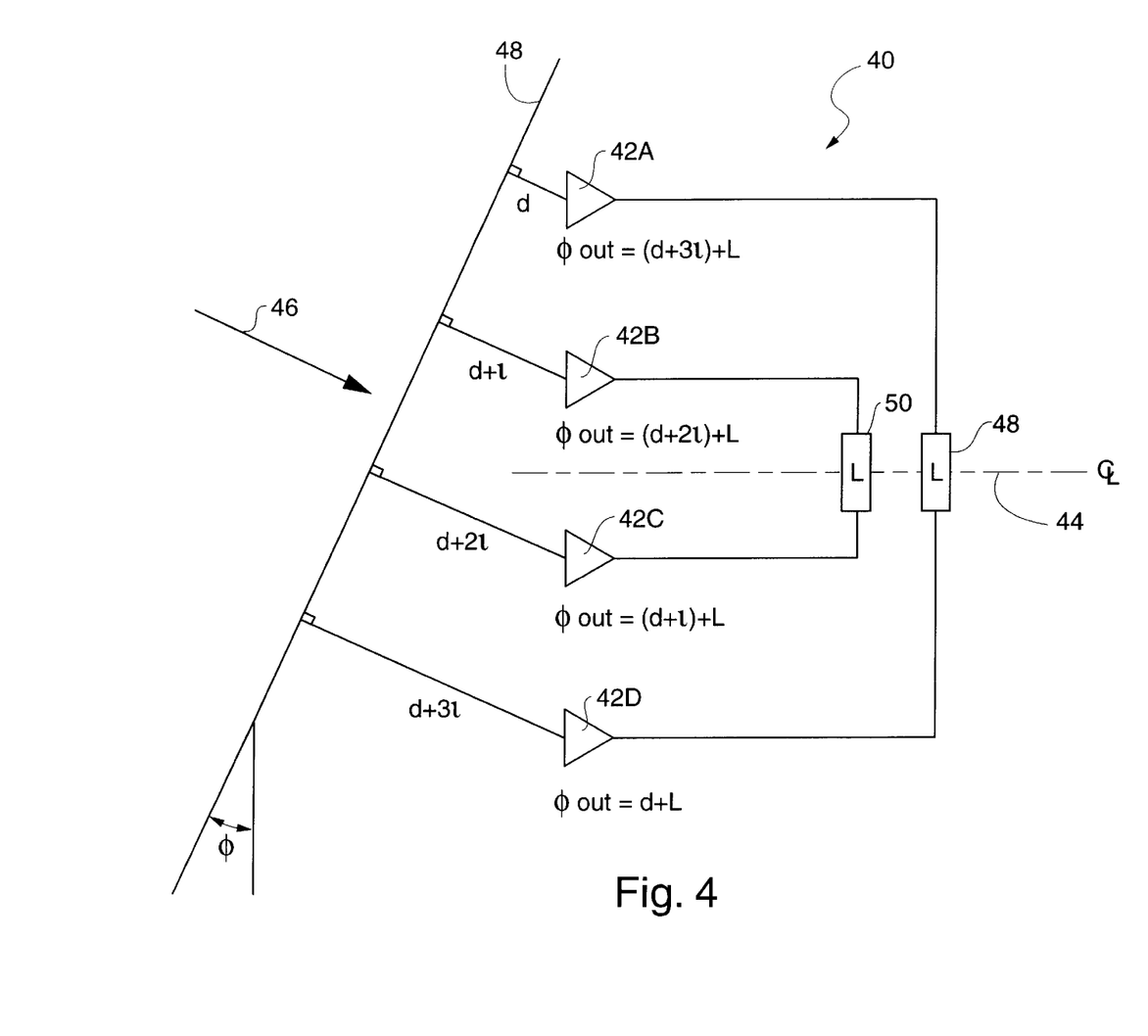
FIG. 4 is a block diagram illustrating the operation of a one dimensional retrodirective array antenna in accordance with one embodiment of the present invention.

With reference to FIG. 4, the operation of a retrodirective array will now be described. For purposes of convenience, the description will be made with respect to a one-dimensional retrodirective array. It should be appreciated, however, that the same general operational principles apply to retrodirective arrays of any size or dimension.

FIG. 4 illustrates a one-dimensional retrodirective array 40 having four equally spaced radiating elements 42A–42D.

The array includes a center line 44 having two elements on one side and two elements on the other. The elements 42A–42D are connected in element pairs, as described above, based on folded positions around the center line 44. Each element pair, i.e., pair 42A/42D and pair 42B/42C, is connected together using a transmission line 48, 50 of electrical length L.

In operation, the retrodirective array 40 will receive a signal from a direction 46. If the source of the signal (e.g., the reader device) is far enough away, the signal will approximate a plane wave, having a substantially planar wavefront 48, when it reaches the array 40. The wavefront 48 comprises a locus of points in the signal which all have the same phase value at the same time. In the description which follows, it will be assumed that the phase value of the wave front 48, as illustrated in FIG. 4, is zero degrees. Because the wavefront 48 is substantially planar, at any point in time the electrical length from the wavefront 48 to any element in the array 40 will be a linear function of the element's position in the array. For example, in the array of FIG. 4, the first element 42A is an electrical length d from the wavefront, the second element 42B is an electrical length d+l from the wavefront, the third element 42C is an electrical length d+2l from the wavefront, etc., where both d and l are constant values.

After the signal is received by the first element 42A, it is launched onto transmission line 48 which carries it to element 42D, from which it is then radiated. Because transmission line 48 is of electrical length L, the phase of the signal when it reaches element 42D, and is just about to be radiated, is d+L. Similarly, after the signal is received by the second element 42B, it is launched onto transmission line 50 which carries the signal to element 42C. The phase of the signal at element 42C, just before it is radiated, is (d+l)+L. Likewise, the signal is received by elements 42C and 42D and is delivered to elements 42B and 42A, respectively. The phase of the signal when it reaches elements 42B and 42A, just before it is radiated, is (d+2l)+L and (d+3l)+L, respectively. Therefore, the phase relationship between the elements upon radiating the signal is simply a linear phase progression across the array. This phase progression results in a radiated beam centered at substantially the same angle from which the signal was received.

Figure 5:
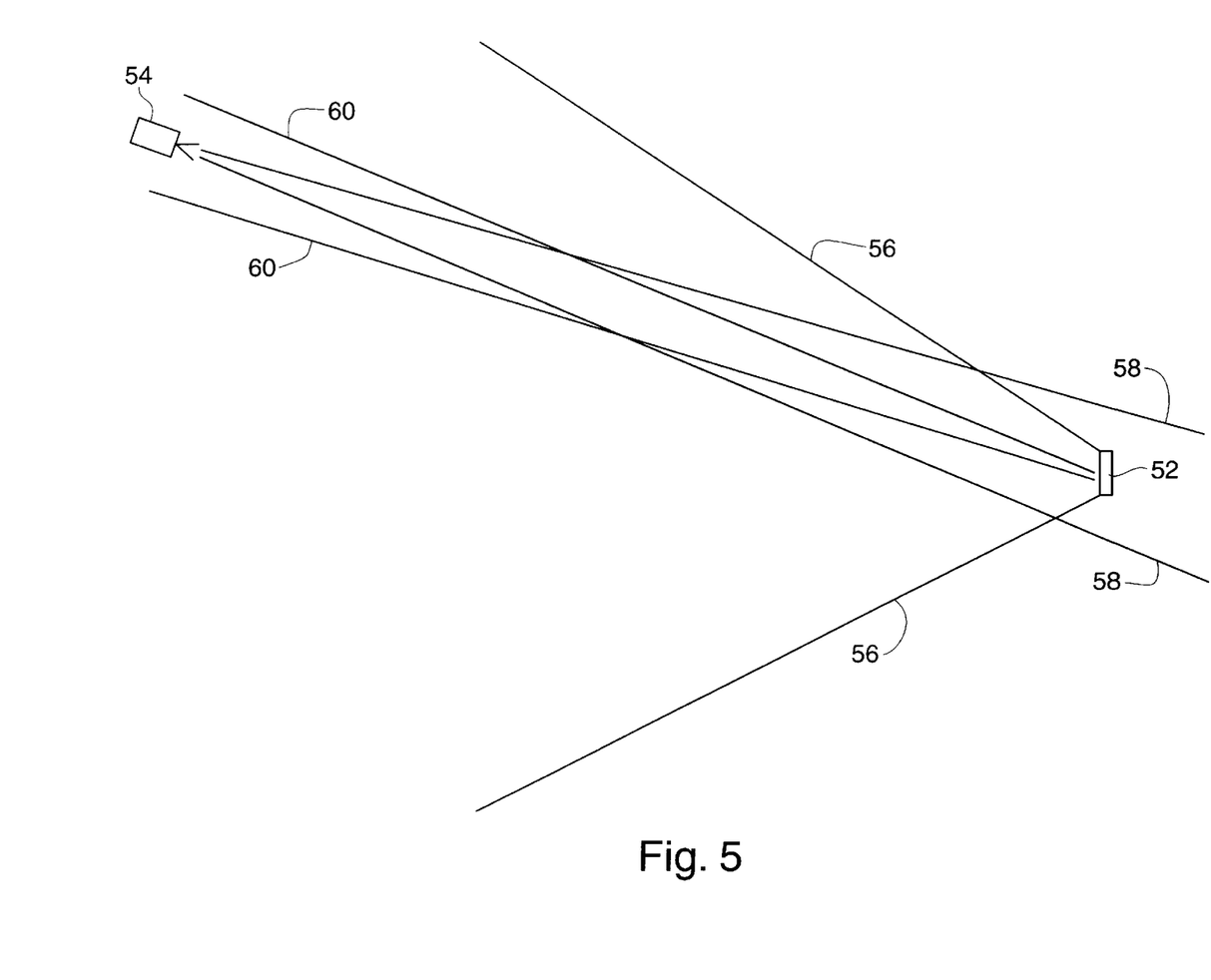
FIG. 5 is a diagram illustrating the operational characteristics of a retrodirective array antenna as used in accordance with the present invention.

FIG. 5 illustrates a retrodirective array 52 being illuminated by a source 54 of electromagnetic energy. The array 52 is capable of receiving a signal from a source 54 located anywhere within a first range of angles 56. The source 54 delivers the signal to the array 52 in a beam 58 having a beamwidth determined by, among other things, the type of antenna used by the source 54. As described previously, after receiving the signal from the source 54, the array 52 returns the signal to the source 54 at substantially the same angle from which it was received. The signal is returned to the source 54 in a beam 60 having a beamwidth determined by, among other things, the configuration and type of elements in the retrodirective array 52.

As can be seen in FIG. 5, the beamwidth of the beam 60 returning the signal to the source 54 is much narrower than the first range of angles 56 over which the retrodirective array 52 is capable of receiving signals. This is in contrast to other antennas for which the receive pattern and the transmit pattern are substantially identical. This ability to receive a signal from any one of a large range of angles and to return the signal in a relatively narrow, i.e., highly directional, beam is of great benefit in systems, such as transponder systems, which must make maximum use of a relatively small amount of radiated energy. By concentrating this limited amount of energy into a relatively narrow beam, greater range is obtained without having to boost the signal before transmission.

As described above, in a transponder device which utilizes a retrodirective array antenna, the interrogation signal flows through a number of different paths within the antenna (each associated with a corresponding element pair) before being radiated back to the reader device. For the transponder device to operate properly, the interrogation signal must be modulated in substantially the same manner in each path through the antenna. In this regard, one embodiment of the present invention provides substantially identical modulation means disposed within each signal path through the transponder device. For example, in the one-dimensional array of FIG. 4, a substantially identical modulation means would be placed somewhere within both transmission line 48 and transmission line 50.

Figure 6:
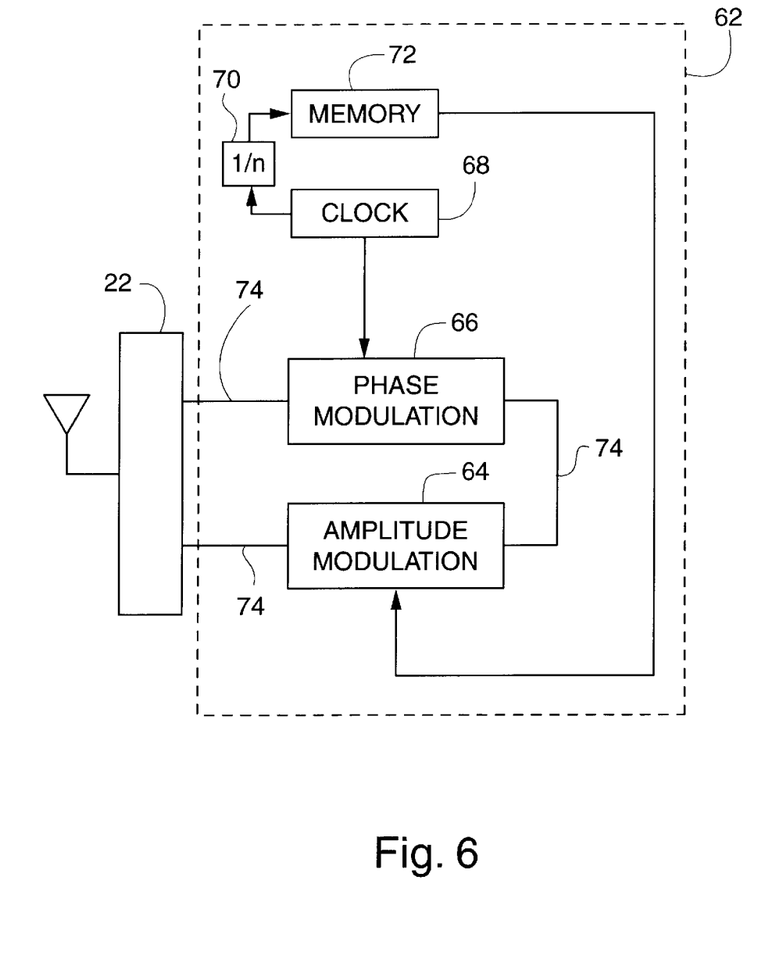
FIG. 6 illustrates a modulation means in accordance with one embodiment of the present invention.

FIG. 6 illustrates a modulation means in accordance with one embodiment of the present invention. For convenience, the modulation means will be referred to by reference numeral 62. As illustrated in the figure, the modulation means 62 includes: amplitude modulation means 64, phase modulation means 66, signal flow path 74, clock 68, clock division unit (CDU) 70, and data memory 72. The modulation means 62 is coupled to an antenna means 22 for communication with an external reader device. The phase modulation means 66 is operative for varying the phase characteristics of the signal flow path 74 in response to a clock signal received from clock 68. The amplitude modulation means 64 is operative for varying the attenuation characteristics of the signal flow path 74 in response to a signal received from the data memory 72. The data memory 72 outputs the signal to the amplitude modulation means 64 in synchrony with a divided clock signal produced by CDU 70. In the preferred embodiment of the present invention, the phase modulation means 66 and the amplitude modulation means 64 continuously vary the characteristics of the signal flow path 74 whether or not an interrogation signal has been received by antenna means 22. Also in the preferred embodiment, clock 68, CDU 70, and data memory 72 are implemented using low-power CMOS circuitry. Power for modulation means 62 is derived from an internal battery, such as battery 28 in FIG. 2.

As described above, in a system utilizing a retrodirective array, a modulation means 62 will be disposed within a signal flow path 74 connecting the elements in each element pair in the array. In such an arrangement, a common clock 68, clock division unit 70, and data memory unit 72 may be utilized to control each of the modulation means 62 in the system.

Figure 7:
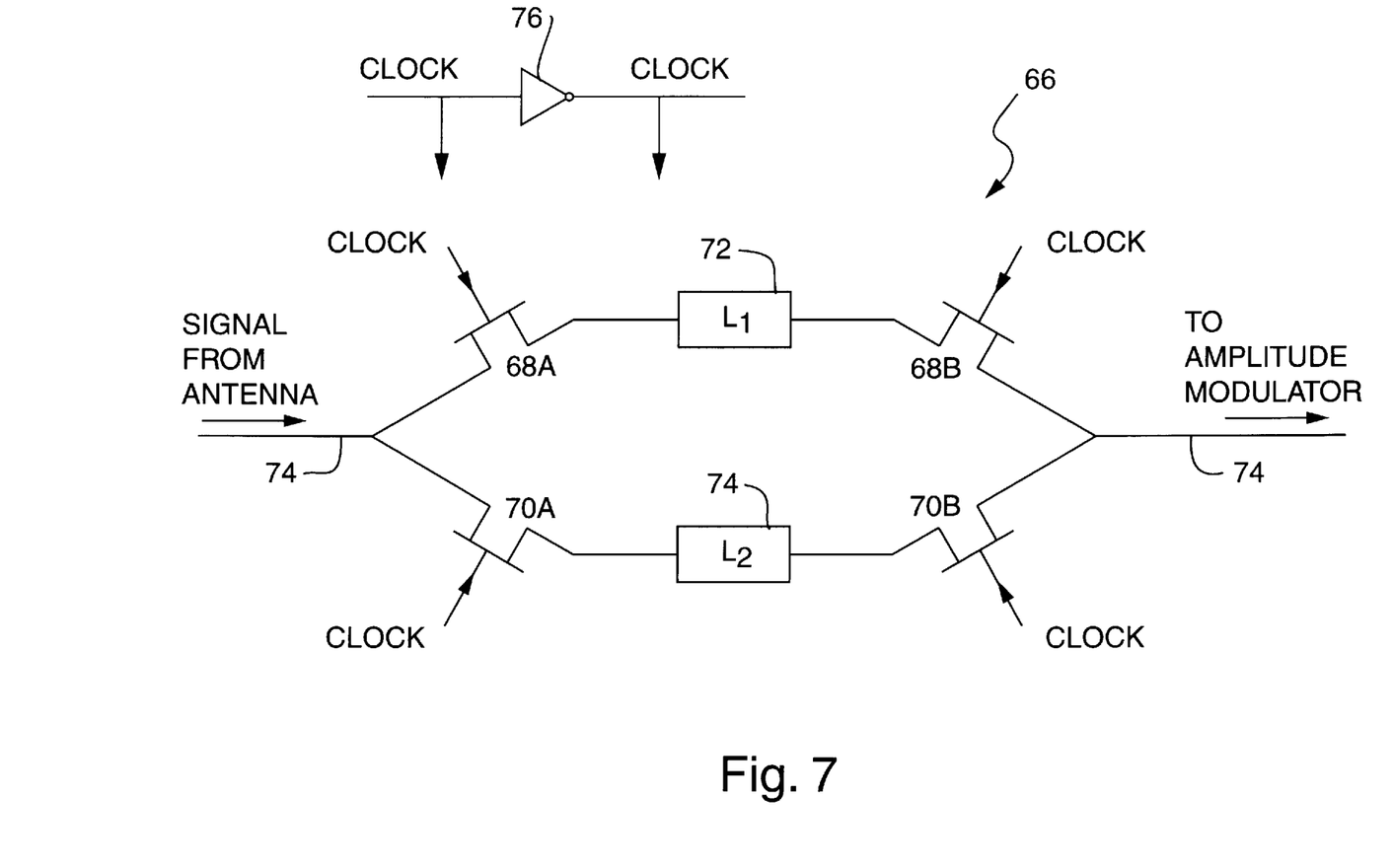
FIG. 7 illustrates a phase modulation means in accordance with one embodiment of the present invention.

FIG. 7 illustrates a phase modulation means 66 in accordance with one embodiment of the present invention. As shown in the figure, the phase modulation means 66 includes: a plurality of switching devices 68A, 68B, 70A, 70B, a pair of transmission line sections 72, 74 of unequal electrical length, and an inverter 76. The phase modulation means 66 operates by alternately switching each of the two transmission line sections 72, 74 into the signal flow path of the transponder device using the switching devices 68A, 68B, 70A, and 70B. The switching devices 68A, 68B associated with the first transmission line section 72 are turned "on" whenever the clock signal from the clock 68 is logic high. Similarly, the switching devices 70A, 70B associated with the second transmission line section are turned "on" whenever an inverted clock signal, produced by inverter 76, is logic high. Because the clock signal and the inverted clock signal will never be logic high at the same time, only one of the two transmission line sections 72, 74 will be part of the signal flow path of the transponder device at any one time. For example, when switching devices 68A and 68B are "on" and switching devices 70A and 70B are "off", an interrogation signal from the antenna will flow through transmission line section 72 but not transmission line section 74. Similarly, when switching devices 70A and 70B are "on" and switching devices 68A and 68B are "off", an interrogation signal from the antenna will flow through transmission line section 74 but not transmission line section 72. By changing the electrical length of the signal flow path 74, any signal received by the transponder device will be phase modulated before being radiated back to the reader device. In a preferred embodiment of the present invention, the transmission line sections 72 and 74 differ in electrical length by 180 degrees. Also in a preferred embodiment, the switching devices 68A, 68B, 70A, and 70B comprise low power FET switches. It should be appreciated that other forms of phase modulation, such as pseudo noise modulation, may be utilized in conjunction with the present invention.

Figure 8:
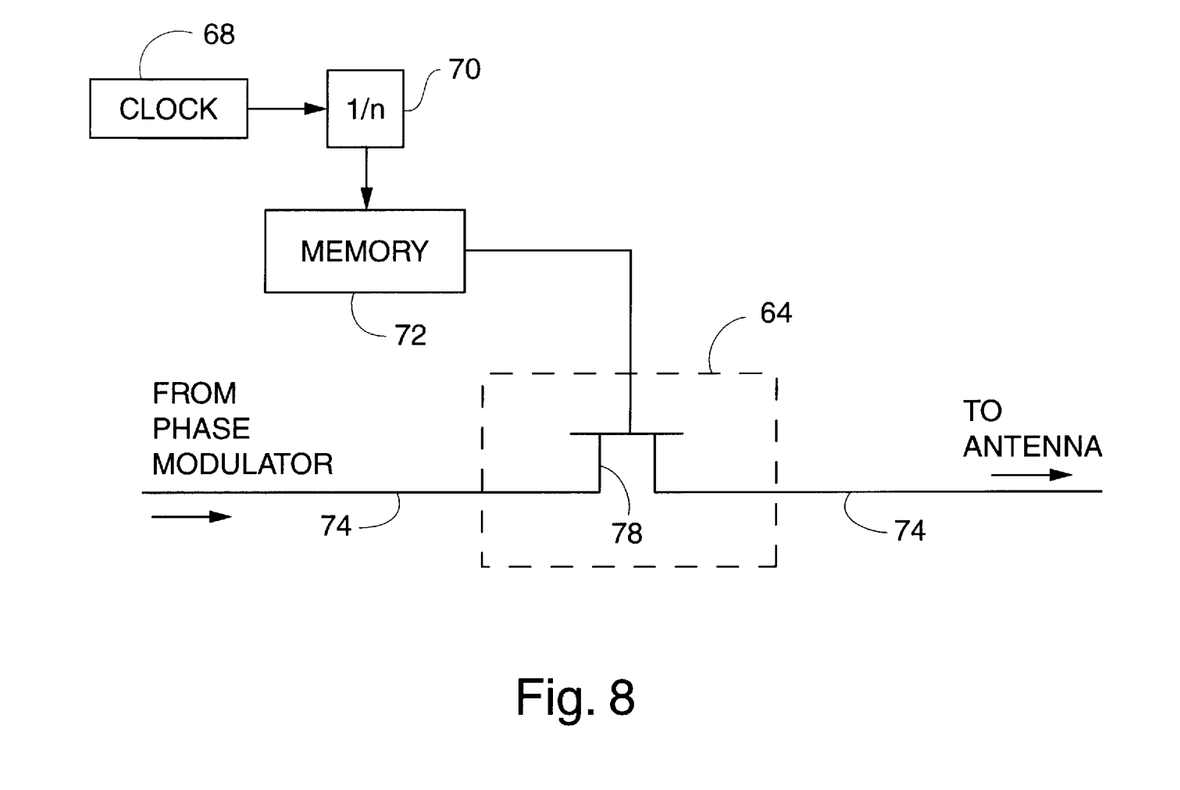
FIG. 8 illustrates an amplitude modulation means in accordance with one embodiment of the present invention.

FIG. 8 illustrates an amplitude modulation means 64 in accordance with one embodiment of the present invention. As shown, the amplitude modulation means 64 comprises a switching device 78 disposed within the signal flow path of the transponder device. The switching device 78 is operative for alternately switching between an open and closed circuit condition in the signal flow path of the transponder device in response to an information signal from data memory 72. As discussed previously, data memory 72 outputs the information signal in response to a divided clock signal produced in CDU 70. The amplitude modulation means 64 of FIG. 8, therefore, provides simple binary modulation of the interrogation signal amplitude. In an alternative embodiment, the switching devices 68A, 68B, 70A, and 70B of FIG.7 may be used to provide the amplitude modulation in addition to the phase modulation. In this alternative embodiment, all of the switching devices 68A, 68B, 70A, and 70B can be turned off whenever an open circuit condition is desired in the signal flow path. This "sharing" of circuitry between the amplitude modulation means 64 and the phase modulation means 66 can significantly reduce implementation costs and circuit size, especially in systems using relatively large retrodirective arrays. The information signal from data memory 72 may include information such as object identification information and battery freshness information. It should be appreciated that other forms of amplitude modulation may also be utilized in conjunction with the present invention.

In the preferred embodiment of the present invention, the phase modulation of the interrogation signal is used by the reader device to discriminate between the actual modified signal returned from the transponder device and background clutter. The phase modulation produces a frequency shift in the interrogation signal which is large enough to allow filters to be used to separate the signal from the clutter. Using different clock rates in different transponder devices allows multiple tags to be interrogated at the same time without interference. Additional discrimination between individual tags may be obtained through the use of range bins and spatial discrimination. The interrogation signal can include almost any type of signal commonly used in radar systems, such as: CW, pulsed, chirp, spread spectrum, dual mode, and other signal types. After the phase modulated component of the modified interrogation signal is removed in the reader device, the information contained in the amplitude modulated component portion can be removed and processed according to the particular application being implemented.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A transponder device for use in an interrogator/transponder system, said device including:

antenna means capable of receiving a signal from any angle in a first range of angles having predetermined boundaries, without a priori knowledge of the arrival of said signal at said antenna means, and subsequently radiating said signal in a beam centered substantially at said angle from which it was received, wherein substantially all of the energy in said radiated signal is concentrated in a second range of angles which is narrower than said first range of angles; and signal modification means for modifying said signal after said signal has been received by said antenna means and before said signal has been radiated from said antenna means.

2. The device, as claimed in claim 1, wherein:
said subsequent radiation of said signal by said antenna means occurs automatically after said signal is received by said antenna means without having to adjust elements within said antenna means.

3. The device, as claimed in claim 1, wherein:
said signal modification means includes phase modulation means for modulating the phase of said signal.

4. The device, as claimed in claim 3, wherein:
said phase modulation means includes at least one of the following: a phase shifter utilizing reactive loading, a phase shifter utilizing filter techniques, and a reflection phase shifter.

5. The device, as claimed in claim 3, wherein:
said phase modulation means includes means, responsive to a phase modulation signal, for changing the phase length of a path which must be traversed by said signal after said signal has been received by said antenna means and before said signal is radiated from said antenna means.

6. The device, as claimed in claim 5, wherein:
said means for changing includes switching means for switching between two separate lengths of transmission line in response to said phase modulation signal.

7. The device, as claimed in claim 6, wherein:
said two separate lengths of transmission line differ in phase length by approximately 180 degrees.

8. The device, as claimed in claim 3, wherein:
said phase modulation means imparts clutter rejection information to said signal.

9. The device, as claimed in claim 1, wherein:
said signal modification means includes amplitude modulation means for modulating the amplitude of said signal.

10. The device, as claimed in claim 9, wherein:
said amplitude modulation means includes means, responsive to an amplitude modulation signal, for varying the attenuation of a path which must be traversed by said signal after said signal has been received by said antenna means and before said signal is radiated from said antenna means.

11. The device, as claimed in claim 10, wherein:
said means for varying includes switching means for alternately allowing and blocking the flow of said signal on said path, in response to said amplitude modulation signal.

12. The device, as claimed in claim 9, wherein:

said amplitude modulation means imparts identification information to said signal.

13. The device, as claimed in claim 1, wherein:

said antenna means includes a retrodirective array.

14. The device, as claimed in claim 13, wherein:

said retrodirective array includes a plurality of radiating elements, said radiating elements being grouped into element pairs, wherein each element pair is coupled together by a transmission line section of substantially the same length; and said signal modification means performs substantially the same signal modification on signal components associated with each of said element pairs.

15. The device, as claimed in claim 1, wherein:

said signal modification means includes both a phase modulation means and an amplitude modulation means.

16. The device, as claimed in claim 15, wherein:

said phase modulation means and said amplitude modulation means include common switching means.

17. A transponder device for use in an interrogator/transponder system, said device comprising:

antenna means capable of receiving a signal from an exterior source and subsequently radiating a modified signal to said exterior source; and signal modification means for receiving said signal from said antenna means, modifying said signal, and delivering said modified signal back to said antenna means, said signal modification means including:
a signal flow path; and
means for continuously and periodically varying the transmission characteristics of said signal flow path regardless of whether said signal is present.

18. The device, as claimed in claim 17, wherein:

said means for continuously and periodically varying includes phase modulation means for varying the phase length of said signal flow path.

19. The device, as claimed in claim 18, wherein:

said phase modulation means includes at least one of the following: a phase shifter utilizing reactive loading, a phase shifter utilizing filter techniques, and a reflection phase shifter.

20. The device, as claimed in claim 17, wherein:

said means for continuously and periodically varying includes amplitude modulation means for varying the attenuation of said signal flow path.

21. The device, as claimed in claim 17, wherein:

said signal modification means includes an internal power source capable of continuously delivering power to said means for continuously and periodically varying regardless of whether said signal is present.

22. The device, as claimed in claim 17, wherein:

said means for varying comprises at least one FET switching device.

23. The device, as claimed in claim 17, wherein:

said means for varying includes clock means for providing a continuous clock signal for use in continuously and periodically varying the transmission characteristics of said signal flow path.

24. The device, as claimed in claim 17, wherein:

said means for varying includes a data memory for storing and retrieving information to be used in continuously and periodically varying the transmission characteristics of said signal flow path.

25. The device, as claimed in claim 24, wherein:

said means for varying further includes clock means for providing a continuous clock signal; and said data memory retrieves said information in synchrony with said continuous clock signal.

26. The device, as claimed in claim 24, wherein:

said information stored within said data memory includes at least one of the following: object identification information and battery freshness data.

27. A transponder device for use in an interrogator/transponder system, said device comprising:

antenna means capable of receiving a signal from an exterior source and subsequently radiating a modified signal to said exterior source; and means for modifying said signal received by said antenna means to create a modified signal, said means for modifying including:
means for receiving said signal from said antenna means;
means for delivering said modified signal to said antenna means;
a signal flow path between said means for receiving and said means for delivering for guiding said signal therebetween;
means for varying the transmission characteristics of said signal flow path so that said signal is modified as it flows through said signal flow path; and
means for receiving power from an internal battery and for providing said power to said means for varying.

28. The device, as claimed in claim 27, wherein:

said means for varying includes at least one FET switching device.

29. The device, as claimed in claim 27, wherein:

said means for varying includes only FET switching devices and CMOS digital circuitry.

30. The device, as claimed in claim 27, wherein:

said means for varying varies only passive characteristics of said signal flow path.

31. The device, as claimed in claim 27, wherein:

said means for varying includes phase modulation means, coupled to said signal flow path, for phase modulating said signal received from said antenna means.

32. The device, as claimed in claim 31, wherein:

said phase modulation means includes at least one switching device for switching transmission line sections of varying lengths into said signal flow path.

33. The device, as claimed in claim 27, wherein:

said means for varying includes amplitude modulation means, coupled to said signal flow path, for amplitude modulating said signal received from said antenna means.

34. The device, as claimed in claim 33, wherein:

said amplitude modulation means includes at least one switching device for changing the attenuation of said signal flow path in response to an amplitude modulation signal.

35. The device, as claimed in claim 27, wherein:

said means for varying includes both phase modulation means and amplitude modulation means.

36. The device, as claimed in claim 35, wherein:

said phase modulation means and said amplitude modulation means include at least one common switching means.

37. The device, as claimed in claim 27, wherein: said antenna means includes a retrodirective array.

* * * * *